Patented Sept. 19, 1939

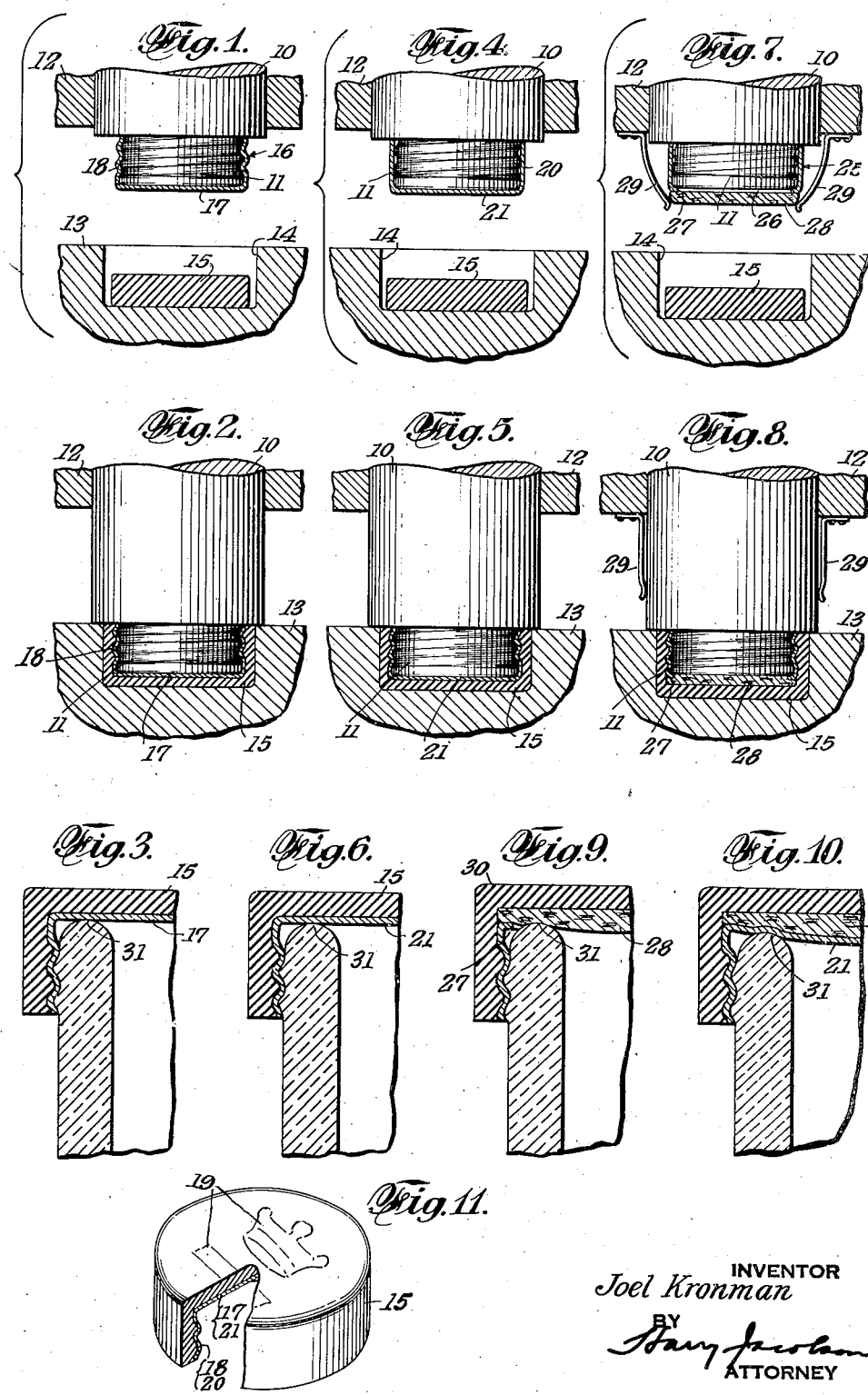

2,173,449

UNITED STATES PATENT OFFICE 2,173,449

COMPOSITE CLOSURE CAP AND METHOD OF MAKING SAME

Joel Kronman, New York, N. Y., assignor to Victor Metal Products Corporation, Brooklyn, N. Y., a corporation of New York Application March 9, 1934, Serial No. 714,797

2 Claims. (Cl. 215—43)

This invention relates to composite bottle caps and particularly, to those adapted to resist the chemical or other action of the contents of a bottle.

Bottle caps heretofore made of synthetic resins such as a phenol-formaldehyde condensation product or similar plastic material could not heretofore be used satisfactorily in connection with bottles containing liquid contents having a high percentage of alcohol. It has been found that caps made of such plastic material are acted upon by the alcoholic contents of the bottle such as liquor, perfume, medicines or the like. In cases where the cap is made of a phenolic resin, the result is an unpleasant phenolic odor. Caps of such plastic material, however, have distinct advantages in that they are moldable into a great variety of forms and designs. They may also be made in a variety of different colors and are durable, not being likely to become distorted under repeated use, though being somewhat brittle, they may chip or crack.

My invention therefore contemplates the provision of a composite molded cap having all the advantages of a molded cap, but preventing the contents of a bottle which is sealed by the cap from coming into contact with the moldable or plastic material thereof.

My invention further contemplates the provision of a composite cap having the inner part thereof made of metal and having the outer part thereof made of plastic material, said parts being firmly and permanently united against separation.

My invention further contemplates the provision of a moldable cap provided with a permanent internal threaded metal lining, which reinforces the cap against chipping and breaking, and which protects the moldable part from contact with the contents of the bottle sealed by said cap.

My invention further contemplates the provision of a simple and efficient method for making my improved composite cap.

The various objects of my invention will be clear from the description which follows, and from the drawing, in which, Fig. 1 is a vertical section of a pair of molding dies by means of which the cap may be made, the metallic portion of the cap being shown as a threaded blank screwed on to the threaded male die, and the plastic material being shown in place in the female die.

Fig. 2 is a similar view of the same, showing the finished cap formed with the inner threaded metallic part and the outer plastic material molded about and united to the metallic part.

Fig. 3 is a similar fragmentary view of the threaded neck portion of a bottle showing the finished cap of Fig. 2 in place on the bottle.

Fig. 4 is a view similar to Fig. 1 showing, however, an unthreaded metallic liner blank.

Fig. 5 is a view similar to Fig. 2 showing the unthreaded metallic blank forced by pressure into threaded form to produce a cap similar to that of Fig. 2.

Fig. 6 is a view similar to Fig. 3 showing the cap of Fig. 5 in place on a bottle.

Fig. 7 is a view of the dies and blanks similar to Figs. 1 and 4, the metallic portion of the cap, however, being shown with a partly open end and with a cork or similar washer inserted thereunder and held in place on the male die prior to the pressure operation of uniting the parts to form the cap.

Fig. 8 is a view similar to Figs. 2 and 5, of the formed and finished cap produced by the dies of Fig. 7.

Fig. 9 is a fragmentary view similar to Figs. 3 and 6, of the finished cap produced by the dies of Figs. 7 and 8 and shown in place on a bottle.

Fig. 10 is a similar fragmentary view of a modified form of the same showing a resilient washer arranged between the metallic portion of the cap and the molded portion thereof.

Fig. 11 is a perspective view of a finished cap, partly in section.

In the practical embodiment of my invention which I have shown by way of example, my improved cap may be made and my improved process carried out by mechanism similar to that heretofore customarily used in the manufacture of caps of plastic material.

As shown, said mechanism comprises a male die as 10 terminating in a reduced threaded portion 11 adapted to hold the metal portion of the cap preparatory to the pressure operation. The thread on said threaded portion corresponds to the thread on the bottle with which the cap is to be used. The male die 10 may be suitably supported and guided as for example by a stationary part 12. The female die 13 is formed with a mold or cavity 14 into which is inserted the desired quantity of the plastic material 15 in plastic form. Both the male and female dies are heated in the customary manner, as for example, by receiving heat from a heated platen on which the dies rest.

In the form of my invention shown in Figs. 1, 2 and 3, the metallic tubular blank 16 forming the inner lining of the cap is provided with a closed end 17 and with a preformed threaded cylindrical portion 18, which is formed with its threads before it is arranged on the portion 11 of the die.

This is particularly desirable where the metal used is comparatively hard, such as aluminum or other suitable and comparatively hard metal.

The dies 10 and 13 are brought together by suitable mechanism well known in the art and therefore not necessary to be illustrated or described in detail. When the male die or plunger 10 is forced into the cavity 14, pressure and heat are applied to the plastic material 15 to force said material inwardly into the threads of the metallic part 16 and outwardly to fill up the die cavity, into the form shown in Figs. 2 and 3. When the dies are now separated to the position of Fig. 1, the finished cap is withdrawn from the cavity 14 and may be readily removed from the die by unscrewing it. It will be understood that the die or mold cavity 14 may be made in any desired shape and that the plastic material 15 may be given any desired color and surface ornamentation 19, (Fig. 11) to provide a finished cap resembling in appearance any of the phenolic resin or other molded caps now customarily used.

It will further be understood that owing to the pressure applied by the dies, the molded material is forced into intimate contact with the metallic part 16, thereby joining the molded and metallic parts permanently and inseparably. The metallic part reinforces the molded part of the cap, and makes it practically unbreakable under ordinary stresses. It also reinforces the molded part of the cap against chipping, thereby preventing any particles of the moldable material from chipping off and falling into the bottle with which the cap may be used. As shown in Fig. 3, the metallic part further prevents access of the contents of the bottle to the molded part of the cap and thereby prevents any chemical or other action therebetween or the formation of gases or the release of unpleasant odors and the contamination of the contents.

In the form of my invention shown in Fig. 4, the metallic part or blank 20 takes the form of a cylindrical tube closed at one end by the end wall 21. The part 20 in this case is preferably made of comparatively soft metal such as tin, or tin and lead alloys, or lead alloys of various kinds, or even lead. The innermost diameter of the closed tube 20 conforms to the greatest outer diameter of the threaded part 11 of the male die, so that said tube may be readily forced on to the part 11 and held thereon by friction. When the male die and female die are brought together and the material 15 extruded, the consequent pressure upon the plastic material forces the wall of the comparatively soft metal tube into intimate contact with the die part 11 throughout and thereby forms the internal threads on the metallic part 20 corresponding to the threads on the die part 11. The finished cap shown in section in Fig. 6 and produced as just described, is similar to the cap of Fig. 3 excepting that the metallic portion is softer and is thereby readily threaded under the pressure of the extruding operation, so that the blank need not be preformed with screw threads thereon.

Referring now to Figs. 7, 8 and 10, the metallic part 25 there shown is preferably of comparatively soft metal but is provided with an opening as 26 in its end wall 27. Said metallic part 25 is arranged on the threaded die part 11 in the same manner as previously described in connection with Fig. 4, being held thereon by friction.

However, a resilient disc as 28 made of cork composition or the like is arranged adjacent the end wall 27 to close the opening 26. If deemed advisable or necessary, said disc 28 may be temporarily held in place by the spring fingers 29 secured to a stationary part as 12 of the die.

As the die part 11 and the female die cavity 14 are brought together, the disc 28 is withdrawn from the stationary spring fingers 29 and is forced against the plastic material 15 during the heating and pressure applying operation as shown in Fig. 8. At the same time, the pressure conforms the cylindrical wall of the metallic part 25 to the threads of the die and causes the parts to be firmly pressed together and securely held. Upon the withdrawal of the male die and the removal of the finished cap therefrom, the washer 28 being resilient, and the pressure thereon being released, it extends into the opening 26, the peripheral part of said washer, however, tending to remain compressed by the comparatively rigid annular end wall 27 of the metallic part of the cap. When the finished cap 30 (Fig. 9) is arranged on the bottle, the end 31 of the bottle compresses the disc 28 at a point spaced from the wall 27 and thereby forms an adequate seal while loss or separation of the disc is prevented by the wall 27.

As shown in Fig. 10, the opening 26 may be dispensed with, and the disc 28 may be compressed throughout its peripheral edge by the end wall 21 of the metallic portion of the cap. Said end wall may be made thinner than the cylindrical walls if desired, but in any case, being made of soft metal, it is unable to withstand the expansion of the resilient washer or disc 28, which bends said end wall when the pressure of the die thereon is released into the position of Fig. 10, the peripheral portion of the end wall, however, being reinforced by the threaded part, remaining rigid. The end wall 21 and the disc 28 are both compressed by the bottle edge when the cap is in use, as is clearly shown in Fig. 10.

It will be understood that regardless of the hardness or softness of the metal lining used in any of the forms of my improved cap, said lining is of sufficient strength and thickness to withstand ordinary use, as when the cap is repeatedly screwed on to the bottle neck and repeatedly unscrewed therefrom.

It will further be seen that I have provided a simple and efficient method for the manufacture of a composite cap formed partly of metal and partly of moldable material and adapted to be carried out economically and efficiently.

While I have shown and described certain specific embodiments of my invention, it will be understood that I do not desire to limit myself thereto but intend to claim my invention as broadly as may be permitted by the state of the prior art and the scope of the appended claims.

I claim:

1. A unitary cap comprising a molded part of resinous material having a closed top, a threaded soft metal lining permanently self-held to the molded part for movement therewith as a unit and of sufficient strength to withstand screwing of the cap on a bottle and the unscrewing thereof and having an end wall and a resilient cork washer interposed and fixed between the closed top of the molded part and the end wall of the lining.

2. A cap comprising a member of moldable resinous material having a tubular wall and an end closing wall, a metallic lining in forced intimate and permanent contact with the tubular wall, said lining having a threaded tubular wall terminating in an imperforate end wall at substantially right angles to the threaded wall, and a flat resilient cork disc interposed and fixed between the end wall of the lining and the closing wall of the member.

JOEL KRONMAN.